US012105779B2

(12) United States Patent
Benkreira et al.

(10) Patent No.: US 12,105,779 B2
(45) Date of Patent: *Oct. 1, 2024

(54) SYSTEMS AND METHODS FOR EMPLOYING A JOYSTICK SEQUENCE TO AUTHENTICATE A USER

(71) Applicant: Capital One Services, LLC, McLean, VA (US)

(72) Inventors: Abdelkader Benkreira, New York, NY (US); Michael Mossoba, Arlington, VA (US); Joshua Edwards, Philadelphia, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/085,015

(22) Filed: Dec. 20, 2022

(65) Prior Publication Data

US 2023/0195864 A1 Jun. 22, 2023

Related U.S. Application Data

(63) Continuation of application No. 16/810,236, filed on Mar. 5, 2020, now Pat. No. 11,580,202.

(51) Int. Cl.
| | |
|---|---|
| *G06F 21/31* | (2013.01) |
| *G06F 3/0338* | (2013.01) |
| *G06Q 20/18* | (2012.01) |
| *G06Q 20/40* | (2012.01) |

(52) U.S. Cl.
CPC .......... *G06F 21/316* (2013.01); *G06F 3/0338* (2013.01); *G06Q 20/18* (2013.01); *G06Q 20/4014* (2013.01)

(58) Field of Classification Search
CPC ..... G06F 21/316; G06F 3/0338; G06Q 20/18; G06Q 20/4014
See application file for complete search history.

(56) References Cited

U.S. PATENT DOCUMENTS

| | | | |
|---|---|---|---|
| 2014/0201832 A1* | 7/2014 | Yi | G06F 21/31 726/19 |
| 2015/0294096 A1 | 10/2015 | Grigg et al. | |
| 2016/0125182 A1 | 5/2016 | Miura et al. | |

(Continued)

*Primary Examiner* — Mohammad W Reza
(74) *Attorney, Agent, or Firm* — HUNTON ANDREWS KURTH LLP

(57) ABSTRACT

Systems and methods for authenticating identification information are disclosed. For example, a system may include an Automated Teller Machine (ATM). An ATM may comprise a user interface. The user interface may comprise a joystick. The user interface may be configured to receive joystick input from a user. The ATM may comprise at least one memory storing instructions. The ATM may comprise at least one processor configured to execute the instructions to perform operations. The operations may comprise receiving identification information from the user. The operations may comprise receiving the joystick input. The operations may comprise extracting a joystick sequence from the joystick input. When the joystick sequence is within a predetermined threshold from a stored joystick sequence corresponding to the identification information, the operations may comprise authenticating the user for an ATM operation.

20 Claims, 12 Drawing Sheets

Automated Teller Machine
702

(56) References Cited

U.S. PATENT DOCUMENTS

2017/0109510 A1\* 4/2017 Kaplan ................ G06F 21/316
2017/0293365 A1 10/2017 Miura et al.
2020/0066071 A1\* 2/2020 Budman ................ H04L 63/08
2021/0029112 A1\* 1/2021 Palle ....................... G06F 21/32

\* cited by examiner

SYSTEMS AND METHODS FOR EMPLOYING A JOYSTICK SEQUENCE TO AUTHENTICATE A USER

CROSS-REFERENCE TO RELATED APPLICATION

The subject application is a continuation of U.S. patent application Ser. No. 16/810,236 filed Mar. 5, 2020, the contents of which is hereby incorporated by reference its entirety.

BACKGROUND

Many payment terminals enable a merchant to capture required bank card (e.g., credit card, debit card, loyalty card) information and to transmit this data to a merchant services provider or bank for authorization and finally, to receive funds from a customer. Many payment terminals enable the merchant or the customer to swipe, insert, or hold the bank card near the device to capture the bank card information. Many payment terminals may be part of or connected to Point of Sale (POS) systems. Many POS systems enable payment amounts and confirmation of payment to be transferred automatically to a retail management system. Many payment terminals may be used in stand-alone mode, where the merchant keys an amount into the device before the customer presents a bank card.

Many Automated Teller Machines (ATMs) and payment terminals enable a customer to transmit required banking information wirelessly from a wireless device such as, for example, a smartphone, smartwatch, and/or electronic wallet. Many ATMs and payment terminals may receive required banking information from a customer via a wireless connection such as, for example, Bluetooth, Bluetooth Low Energy (BLE), NFC, Wi-Fi, cellular, RFID, or any other wireless connection.

Conventional ATMs and payment terminals often require a user (i.e., a customer) to enter a Personal Identification Number (PIN) to authenticate identification information via a keypad. Many payment terminals require a user to enter a zip code to authenticate identification information via a keypad. Identification information may be provided by a bank card, or provided separately via a wireless device. Providing identification information may require a login and/or password.

Problems may arise in conventional approaches and devices when users forget their PIN. This may result in inefficient transaction procedures. Use of a keypad in conventional devices may lead to breaches in security if onlookers are able to monitor and copy hand movements. When users associate a PIN with other personal information that can be easily compromised, breaches in security may result. In addition, a zip code associated with an account of a user can be easily compromised.

Accordingly, given the shortcomings of conventional approaches and devices, a need exists for unconventional approaches and devices that securely and efficiently enable users to authenticate their identification information.

SUMMARY

The disclosed embodiments provide unconventional systems and methods for authenticating identification information of a user. Embodiments consistent with the present disclosure are rooted in computer technology and may include processing a joystick sequence from a user. Use of a joystick sequence may lead to improved efficiency of completing transactions over conventional devices and approaches since a joystick sequence may be easier to remember than a PIN for many users. For example, a user may choose a joystick sequence memorized as part or all of a joystick sequence required in an electronic game connected to a joystick for input. Use of a joystick sequence may improve security over conventional devices and approaches since a joystick sequence may be more difficult than a PIN or zip code for onlookers to copy. Furthermore, personal information that may be compromised is less likely to be tied to a joystick sequence than a PIN.

Consistent with the present embodiments, an Automated Teller Machine (ATM) is disclosed. An ATM may comprise a user interface, which may comprise a joystick and be configured to receive joystick input from a user. Joystick input may comprise all movements, the timing of all movements, and/or the timing between all movements from a user operating the joystick. The ATM may comprise at least one memory storing instructions and at least one processor configured to execute the instructions to perform operations comprising: receiving identification information from the user, receiving the joystick input, and extracting a joystick sequence from the joystick input. When the joystick sequence is within a predetermined threshold from a stored joystick sequence corresponding to the identification information, the operations may comprise authenticating the user for at least one ATM operation. The operations may further comprise: communicating the identification information to an authenticator, communicating the joystick sequence to the authenticator, and receiving an authentication result from the authenticator. The authentication result may comprise a confirmation that the joystick sequence is within the predetermined threshold from the stored joystick sequence corresponding to the identification information. The operations may further comprise: encrypting the identification information prior to communicating to the authenticator, and encrypting the joystick sequence prior to communicating to the authenticator.

Consistent with the present embodiments, a Point of Sale (POS) system is disclosed. A POS system may comprise a payment terminal, which may comprise a user interface. The user interface may comprise a joystick and may be configured to receive joystick input from a user. The POS system may comprise at least one memory storing instructions and at least one processor configured to execute the instructions to perform operations comprising: receiving identification information from the user, receiving the joystick input, and extracting a joystick sequence from the joystick input. When the joystick sequence is within a predetermined threshold from a stored joystick sequence corresponding to the identification information, the operations may comprise authenticating the user for at least one payment operation. The operations may further comprise: communicating the identification information to an authenticator, communicating the joystick sequence to the authenticator, and receiving an authentication result from the authenticator. The authentication result may comprise a confirmation that the joystick sequence is within the predetermined threshold from the stored joystick sequence corresponding to the identification information. The operations may comprise: encrypting the identification information prior to communicating to the authenticator, and encrypting the joystick sequence prior to communicating to the authenticator.

Consistent with the present embodiments, a method for authenticating a user is disclosed. The method may comprise: receiving identification information from a user, receiving joystick input from the user, and extracting a joystick sequence from the joystick input. When the joystick sequence is within a predetermined threshold from a stored joystick sequence corresponding to the identification information, the method may comprise authenticating the user for a secure operation. The method may further comprise: communicating the identification information to an authenticator, communicating the joystick sequence to the authenticator, and receiving an authentication result from the authenticator. The authentication result may comprise a confirmation that the joystick sequence is within the predetermined threshold from the stored joystick sequence corresponding to the identification information. The method may further comprise: encrypting the identification information prior to communicating to the authenticator, and encrypting the joystick sequence prior to communicating to the authenticator The disclosed systems and methods may be implemented using a combination of conventional hardware and software as well as specialized hardware and software, such as one or more machines constructed and/or programmed specifically for performing functions associated with the disclosed method steps. The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
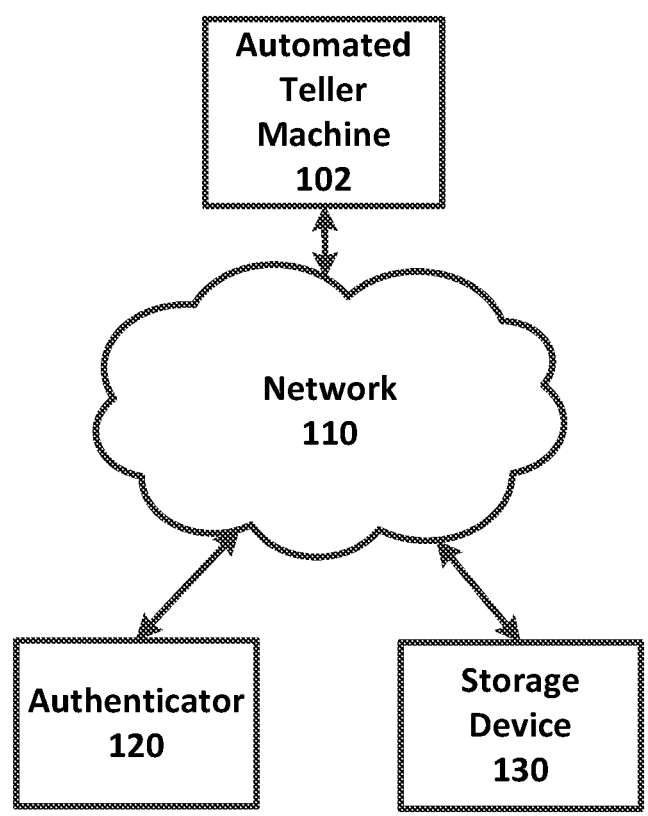
FIG. 1 is a block diagram of a first exemplary system for authenticating identification information of a user, consistent with disclosed embodiments.

Consistent with disclosed embodiments, systems and methods for authenticating identification information of a user are disclosed. As explained above, disclosed systems and methods provide efficiency and security over conventional approaches to authentication.

As used herein, an Automated Teller Machine (ATM) may refer to an electronic telecommunications device that enables customers of financial institutions to perform financial transactions, such as cash withdrawals, deposits, transfers of funds, or account information inquiries, at any time and without the need for direct interaction with bank staff. An ATM may be referred to as an automated banking machine (ABM), cash point, cash machine, or cash dispenser.

As used herein, a payment terminal may refer to an electronic telecommunications device that enables customers of a merchant to perform financial transactions, such as transferring funds to the merchant. Many payment terminals enable customers to receive cash back as part of their transaction. A payment terminal may be referred to as a Point of Sale (POS) terminal, credit card terminal, or Process Data Quickly (PDQ) terminal.

Embodiments consistent with the present disclosure may include identification information, which may comprise banking information. The banking information may comprise, for example, part or all of an account number, a financial institution, and/or bank routing information. Identification information may associate a user to banking information. Identification information may comprise user identification information. For example, user identification information may comprise a federal identification number (e.g., a social security number), a state identification number (e.g., a driver license number), and/or local identification information (e.g., a mailing address, a phone number).

Embodiments consistent with the present disclosure may include a joystick sequence. A joystick sequence may comprise at least one joystick input and/or input duration, which may be entered by a user through use of a joystick and may comprise at least one of a directional input, multi-directional input, center input, rolled input, or any other joystick input. Examples of directional input include up, down, left, or right. Examples of multi-directional input include upper right, upper left, lower right, or lower left. Center input may comprise a neutral position of a joystick at rest and/or a return to center after a previous input. A rolled input may comprise a movement between two inputs without a center input in between the two inputs. For example, a left input followed by a down input without a center input in between may be considered as a rolled left-down input. In contrast, a left input followed by a center input followed by a down input may be considered a left input followed by a down input. An input duration may comprise a length of time an input is held in position. For example, a first joystick sequence comprising a left input, hold for 2 seconds, and a right input may be distinct from a second joystick sequence comprising a left input, hold for 4 seconds, and a right input.

Embodiments consistent with the present disclosure may include a stored joystick sequence. A stored joystick sequence may correspond to identification information of a user, and may comprise a joystick sequence chosen by a user, or a joystick sequence entered by a user in response to a request for storing a joystick sequence. A request for storing a joystick sequence may require a login and password to an account associated with identification information of a user. A request for storing a joystick sequence may require a PIN. A PIN may be required at a user interface, for example, at an ATM or POS payment terminal. A request for storing a joystick sequence may comprise presentation of instructions for creating a joystick sequence. In some embodiments, a stored joystick sequence may be a sequence of inputs and input durations selected via a user interface other than a joystick. For example, a list of possible inputs and input durations may be presented to a user on a touchscreen display. A user may select a sequence of inputs, and optionally, input durations, to be stored. In this example, future joystick input from a user interface comprising a joystick may be compared to a stored joystick sequence created via the touchscreen display. One of ordinary skill in the art would understand that other types of user interfaces other than joysticks may be used to request and/or record a joystick sequence to be stored as a stored joystick sequence.

Embodiments consistent with the present disclosure may include a predetermined threshold. A predetermined threshold may be based on a portion (e.g., a percentage) of a joystick input and/or a fixed amount of travel. For example, a right input may comprise an entire amount of travel in a joystick between a center input and a right input. If a predetermined threshold is set to, for example, 80 percent, then any movement to the right equal to or greater than 80 percent of the entire amount of travel in a joystick between a center input and a right input may be considered within a predetermined threshold. In another example, a right input may comprise a travel of 15 millimeters. If a predetermined threshold is set to, for example, 10 millimeters, then any movement to the right equal to or greater than 10 millimeters may be considered within a predetermined threshold.

In some embodiments, a predetermined threshold may be based on a percentage of an input duration and/or a fixed duration. For example, an input duration may comprise 2 seconds. If a predetermined threshold is set to, for example, 80 percent, then any input duration between 1.6 seconds and 2.4 seconds may be considered within a predetermined threshold. In another example, an input duration may comprise 1 second. If a predetermined threshold is set to, for example, 0.5 seconds, then any input duration between 0.5 seconds and 1.5 seconds may be considered within a predetermined threshold.

In some embodiments, a predetermined threshold may be based on an average of multiple joystick sequences. A predetermined threshold may be specific to an individual user. For example, a request for storing a joystick sequence may comprise a request to enter the same joystick sequence multiple times. An amount of travel and/or an input duration may be recorded for each joystick input of each joystick sequence. The amounts of travel for a specific joystick input may be averaged over the multiple joystick sequences to determine an average amount of travel for the specific joystick input. Similarly, the input durations for a specific joystick input and/or in between two consecutive joystick inputs may be averaged over the multiple joystick sequences to determine an average input duration for the specific joystick input and/or in between two consecutive joystick inputs.

In some embodiments, a predetermined threshold may be based on a maximum variability over multiple joystick sequences. For example, a request for storing a joystick sequence may comprise a request to enter the same joystick sequence multiple times. An amount of travel and/or an input duration may be recorded for each joystick input of each joystick sequence. A maximum range of amounts of travel for a specific joystick input over the multiple joystick sequences may be used to determine a maximum amount of travel for the specific joystick input. Similarly, a maximum range of input durations for a specific joystick input and/or in between two consecutive joystick inputs over the multiple joystick sequences may be used to determine a maximum input duration for the specific joystick input and/or in between two consecutive joystick inputs.

Embodiments consistent with the present disclosure may include at least one ATM operation which may include, for example, cash withdrawals, deposits, transfers of funds, or account information inquiries. ATM operations may also include accepting a new joystick sequence for a user and storing the joystick sequence as a stored joystick sequence.

Embodiments consistent with the present disclosure may include at least one payment operation which may include, for example, transferring funds to a merchant. Funds may be transferred via a credit transaction or via a debit transaction. According to some embodiments, a payment transaction may comprise transferring part of the transaction amount in cash back to a customer.

Reference will now be made in detail to exemplary embodiments, examples of which are illustrated in the accompanying drawings and disclosed herein. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

FIG. 1 is a block diagram of a first exemplary system 100 for authenticating identification information of a user, consistent with disclosed embodiments. System 100 may comprise: an Automated Teller Machine (ATM) 102, an authenticator 120, and a storage device 130. Components of system 100 (e.g., ATM 102, authenticator 120, storage device 130) may be configured to communicate with network 110. In some embodiments, not depicted in FIG. 1, authenticator 120 and/or storage device 130 may be a part of ATM 102. In some embodiments, not depicted in FIG. 1, ATM 102 may be configured to communicate directly with authenticator 120 and/or storage device 130. ATM 102 may be configured to communicate with authenticator 120 and/or storage device 130 over a secured connection. Consistent with the present embodiments, components of system 100 may be included in a cloud computing system. For example, one or more components of system 100 may be hosted by separate virtual computing instances of a cloud computing system.

In some embodiments, ATM 102 may include at least one memory, input/output device, processor, and/or other component. Authenticator 120 may include at least one memory, input/output device, processor, and/or other component, consistent with disclosed embodiments. Authenticator 120 may be configured to authenticate a joystick sequence. Authenticator 120 may be configured to compare a joystick sequence to a stored joystick sequence. Storage device 130 may include at least one memory, input/output device, processor, and/or other component, consistent with disclosed embodiments. Storage device 130 may be configured to store a joystick sequence as a stored joystick sequence. The stored joystick sequence may be stored with and/or linked to identification information for a user. Further details of an ATM are provided below (FIG. 2).

Network 110 may be a public network or private network and may include, for example, a wired or wireless network, including, without limitation, a Local Area Network, a Wide Area Network, a Metropolitan Area Network, an IEEE standard compliant wireless network (e.g., "Wi Fi"), a network of networks (e.g., the Internet), a land line telephone network, or any other network. Network 110 may be connected to other networks (not depicted in FIG. 1) to connect various system components to each other and/or to external systems or devices. In some embodiments, network 110 may be a secure network and require a password to access the network.

Figure 2:
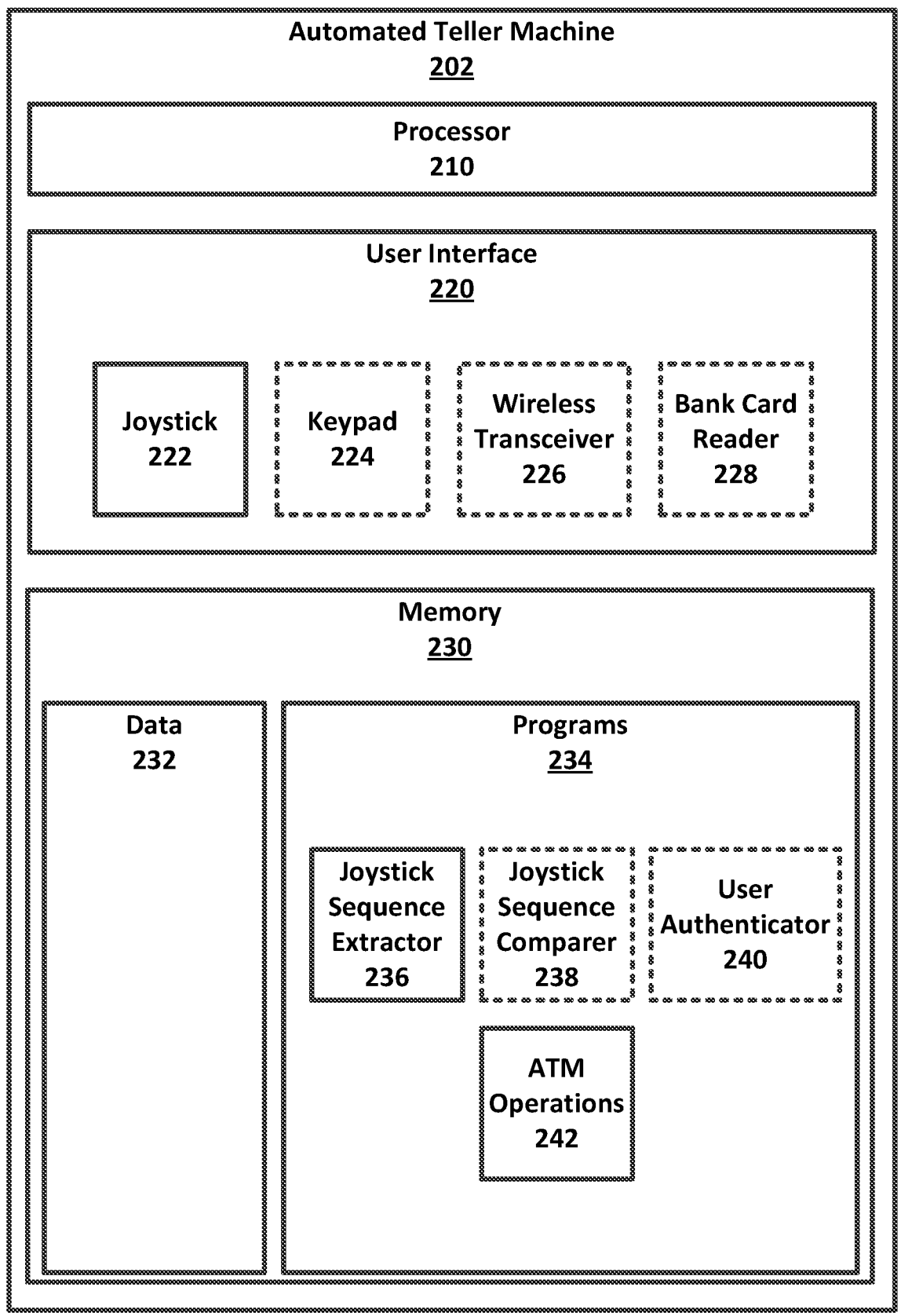
FIG. 2 is a block diagram of an exemplary Automated Teller Machine (ATM), consistent with disclosed embodiments.

FIG. 2 is a block diagram of an exemplary Automated Teller Machine (ATM) 202, consistent with disclosed embodiments. As shown, ATM 202 may comprise at least one processor 210, user interface 220, and/or memory 230. As will be appreciated by one skilled in the art, the components and arrangement of components included in ATM 202 may vary. For example, as compared to the depiction in FIG. 2, ATM 202 may include a larger or smaller number of processors, user interfaces, or memories. In addition, ATM 202 may further include other components or devices not depicted that perform or assist in the performance of one or more processes consistent with the disclosed embodiments. The components and arrangements shown in FIG. 2 are not intended to limit the disclosed embodiments, as the components used to implement the disclosed processes and features may vary.

Processor 210 may comprise known computing processors. In some embodiments, processor 210 may include a microprocessor. Processor 210 may comprise a single core or multiple core processor that executes parallel processes simultaneously. For example, processor 210 may be a single core processor configured with virtual processing technologies. In some embodiments, processor 210 may use logical processors to simultaneously execute and control multiple processes. Processor 210 may implement virtual machine technologies, or other known technologies to provide the ability to execute, control, run, manipulate, store, etc., multiple software processes, applications, programs, etc. In another embodiment, processor 210 may include a multiple core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 210 may execute various instructions stored in memory 230 to perform various functions of the disclosed embodiments described in greater detail below. Processor 210 may be configured to execute functions written in one or more known programming languages.

User interface 220 may include at least one joystick 222 and may be configured to receive joystick input from a user via joystick 222. User interface 220 may include at least one keypad 224, wireless transceiver 226, and/or bank card reader 228. Wireless transceiver 226 may be configured to communicate with a wireless device, such as a smartphone, smartwatch, and/or electronic wallet. Bank card reader 228 may be configured to communicate with or read a bank card magnetically and/or wirelessly using, for example, RFID, NFC, Bluetooth, Bluetooth Low Energy (BLE), Wi-Fi, cellular, or any other wireless connection. In some embodiments not depicted in FIG. 2, user interface 220 may include at least one of a display, an LED, a router, a touchscreen, a keyboard, a microphone, a speaker, a haptic device, a camera, a button, a dial, a switch, a knob, an additional input device, an output device, or any other input/output device to perform methods of the disclosed embodiments. User interface 220 may be configured to receive identification information from a user.

Memory 230 may include a volatile or nonvolatile, magnetic, semiconductor, optical, removable, non-removable, or other type of storage device or tangible (i.e., non-transitory) computer readable medium, consistent with disclosed embodiments. Memory 230 may comprise data 232, programs 234, and/or other components.

Data 232 may comprise stored joystick sequences. Data 232 may comprise stored identification information.

Programs 234 may comprise instructions configured to cause at least one processor 210 to perform operations. Programs 234 may include one or more programs (e.g., modules, code, scripts, or functions) used to perform methods consistent with disclosed embodiments, and operating systems (not shown) that perform known operating system functions when executed by one or more processors. Disclosed embodiments may operate and function with computer systems running any type of operating system. Programs 234 may be written in one or more programming or scripting languages. One or more of such software sections or modules of memory 230 may be integrated into a computer system, non-transitory computer readable media, or existing communications software. In some embodiments, programs 234 may be implemented or replicated as firmware or circuit logic.

One or more programs 234 may comprise at least one joystick sequence extractor 236 which may be configured to extract a joystick sequence from a joystick input. One or more programs 234 may comprise at least one joystick sequence comparer 238, which may be configured to compare a joystick sequence to a stored joystick sequence. In some embodiments, joystick sequence comparer 238 may be configured to determine when a joystick sequence is within a predetermined threshold from a stored joystick sequence corresponding to identification information for a user. One or more programs 234 may comprise at least one user authenticator 240, which may be configured to authenticate a user. A user may be authenticated for at least one ATM operation 242, consistent with disclosed embodiments.

Figure 3:
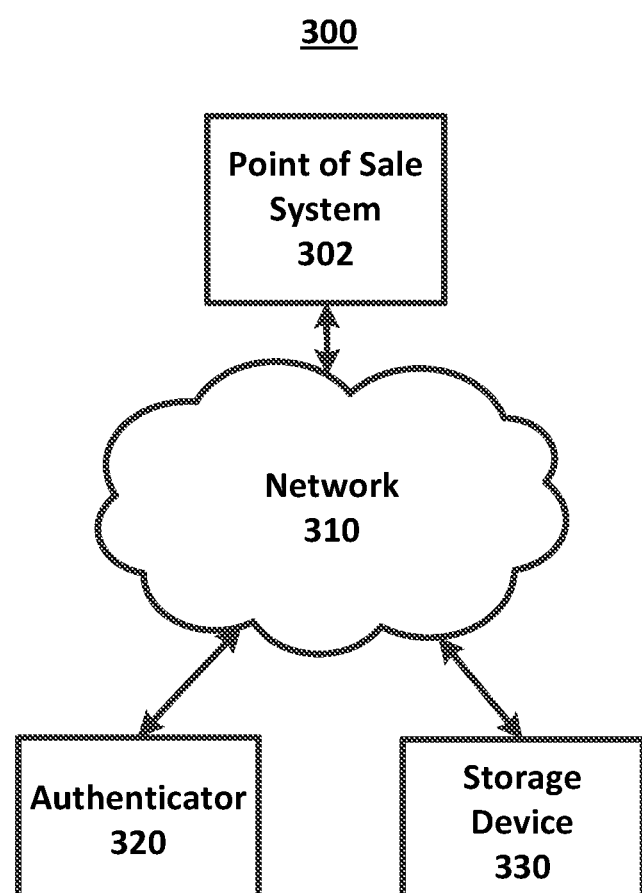
FIG. 3 is a block diagram of a second exemplary system for authenticating identification information of a user, consistent with disclosed embodiments.

FIG. 3 is a block diagram of a second exemplary system 300 for authenticating identification information of a user, consistent with disclosed embodiments. System 300 may comprise a Point of Sale (POS) system 302, an authenticator 320, and a storage device 330. Components of system 300 (e.g., POS System 302, authenticator 320, storage device 330) may be configured to communicate with network 310. In some embodiments, not depicted in FIG. 3, one or both of authenticator 320 and storage device 330 may be a part of POS System 302. In some embodiments, not depicted in FIG. 3, POS System 302 may be configured to communicate directly with authenticator 320 and/or storage device 330. POS System 302 may be configured to communicate with authenticator 320 and/or storage device 330 over a secured connection. Consistent with the present embodiments, components of system 300 may be included in a cloud computing system. For example, one or more components of system 300 may be hosted by separate virtual computing instances of a cloud computing system.

In some embodiments, POS System 302 may include at least one memory, input/output device, processor, and/or other component. Authenticator 320 may include at least one memory, input/output device, processor, and/or other component, consistent with disclosed embodiments. Authenticator 320 may be configured to authenticate a joystick sequence and/or compare a joystick sequence to a stored joystick sequence. Storage device 330 may include at least one memory, input/output device, processor, and/or other component, consistent with disclosed embodiments, and may be configured to store a joystick sequence as a stored joystick sequence. The stored joystick sequence may be stored with identification information for a user or may be linked to identification information for a user. Further details of a POS System are provided below (FIG. 4).

Network 310 may be a public network or private network and may include, for example, a wired or wireless network, including, without limitation, a Local Area Network, a Wide Area Network, a Metropolitan Area Network, an IEEE standard compliant wireless network (e.g., "Wi Fi"), a network of networks (e.g., the Internet), a land line telephone network, or any other network. Network 310 may be connected to other networks (not depicted in FIG. 3) to connect various system components to each other and/or to external systems or devices. In some embodiments, network 310 may be a secure network and require a password to access the network.

Figure 4:
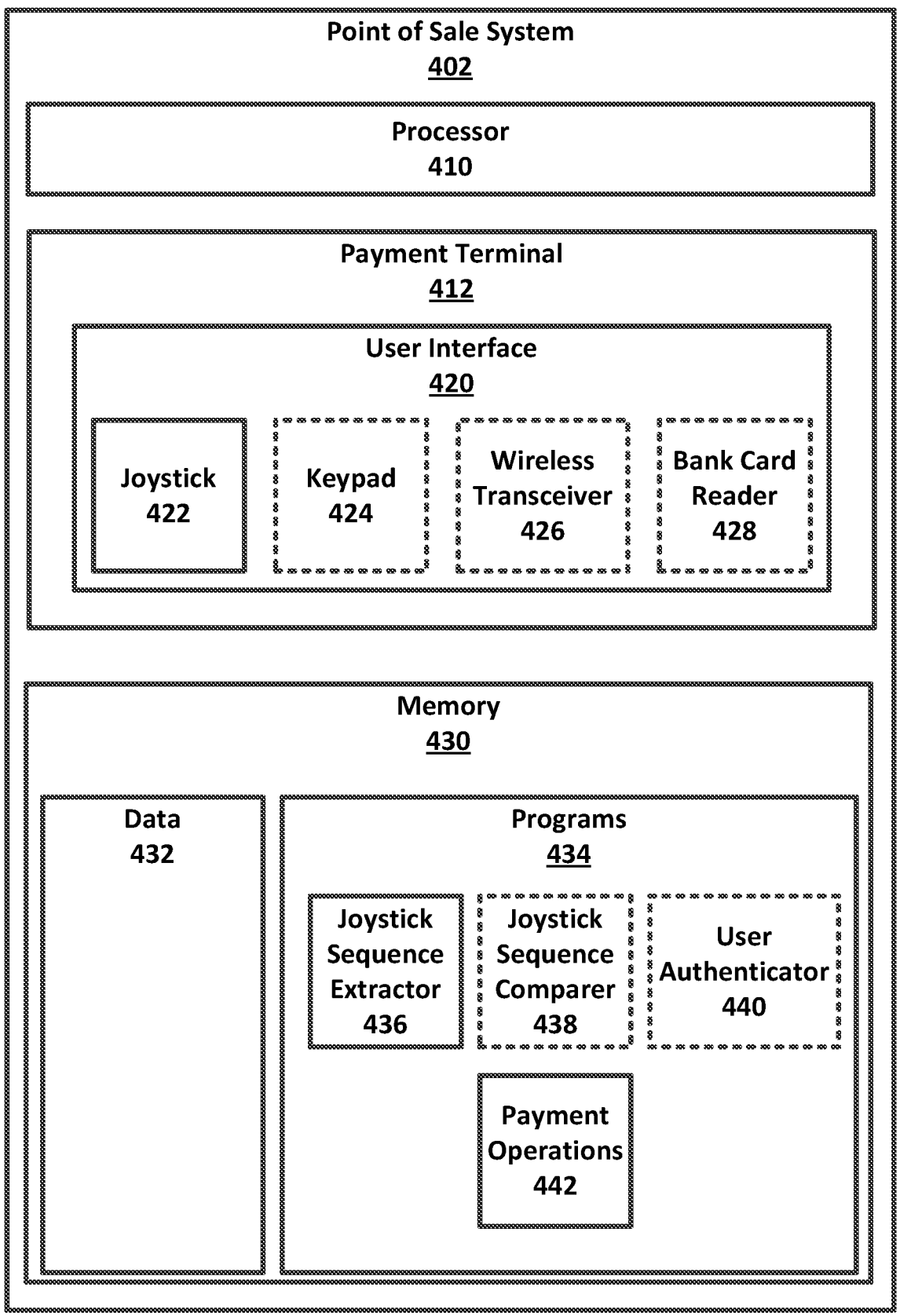
FIG. 4 is a block diagram of an exemplary Point of Sale (POS) system, consistent with disclosed embodiments.

FIG. 4 is a block diagram of an exemplary Point of Sale (POS) system 402, consistent with disclosed embodiments. As shown, POS System 402 may comprise at least one processor 410, payment terminal 412, and/or memory 430. As will be appreciated by one skilled in the art, the components and arrangement of components included in POS System 402 may vary. For example, as compared to the depiction in FIG. 4, POS System 402 may include a larger or smaller number of processors, user interfaces, or memories. In addition, POS System 402 may further include other components or devices not depicted that perform or assist in the performance of one or more processes consistent with the disclosed embodiments. The components and arrangements shown in FIG. 4 are not intended to limit the disclosed embodiments, as the components used to implement the disclosed processes and features may vary.

Processor 410 may comprise known computing processors. In some embodiments, processor 410 may include a microprocessor. Processor 410 may comprise a single core or multiple core processor that executes parallel processes simultaneously. For example, processor 410 may be a single core processor configured with virtual processing technologies. In some embodiments, processor 410 may use logical processors to simultaneously execute and control multiple processes. Processor 410 may implement virtual machine technologies, or other known technologies to provide the ability to execute, control, run, manipulate, store, etc., multiple software processes, applications, programs, etc. In another embodiment, processor 410 may include a multiple core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 410 may execute various instructions stored in memory 430 to perform various functions of the disclosed embodiments described in greater detail below. Processor 410 may be configured to execute functions written in one or more known programming languages.

Payment terminal 412 may comprise user interface 420 which may include at least one joystick 422 and may be configured to receive joystick input from a user via joystick 422. User interface 420 may include at least one keypad 424, wireless transceiver 426, and/or bank card reader 428. Wireless transceiver 426 may be configured to communicate with a wireless device, such as, a smartphone, smartwatch, and/or electronic wallet. Bank card reader 428 may be configured to communicate with or read a bank card magnetically and/or wirelessly using, for example, RFID, NFC, Bluetooth, Bluetooth Low Energy (BLE), Wi-Fi, cellular, or any other wireless connection. In some embodiments not depicted in FIG. 4, user interface 420 may include at least one of a display, an LED, a router, a touchscreen, a keyboard, a microphone, a speaker, a haptic device, a camera, a button, a dial, a switch, a knob, an additional input device, an output device, or any other input/output device to perform methods of the disclosed embodiments. User interface 420 may be configured to receive identification information from a user.

Memory 430 may include a volatile or nonvolatile, magnetic, semiconductor, optical, removable, non-removable, or other type of storage device or tangible (i.e., non-transitory) computer readable medium, consistent with disclosed embodiments. Memory 430 may comprise data 432, programs 434, and/or other components. Data 432 may comprise stored joystick sequences. Data 432 may comprise stored identification information.

Programs 434 may comprise instructions configured to cause at least one processor 410 to perform operations. Programs 434 may include one or more programs (e.g., modules, code, scripts, or functions) used to perform methods consistent with disclosed embodiments, and operating systems (not shown) that perform known operating system functions when executed by one or more processors. Disclosed embodiments may operate and function with computer systems running any type of operating system. Programs 434 may be written in one or more programming or scripting languages. One or more of such software sections or modules of memory 430 may be integrated into a computer system, non-transitory computer readable media, or existing communications software. In some embodiments, programs 434 may be implemented or replicated as firmware or circuit logic.

One or more programs 434 may comprise at least one joystick sequence extractor 436 which may be configured to extract a joystick sequence from a joystick input. One or more programs 434 may comprise at least one joystick sequence comparer 438 which may be configured to compare a joystick sequence to a stored joystick sequence. In some embodiments, joystick sequence comparer 438 may be configured to determine when a joystick sequence is within a predetermined threshold from a stored joystick sequence corresponding to identification information for a user. One or more programs 434 may comprise at least one user authenticator 440 which may be configured to authenticate a user. A user may be authenticated for at least one payment operation 442, consistent with disclosed embodiments.

Figure 5:
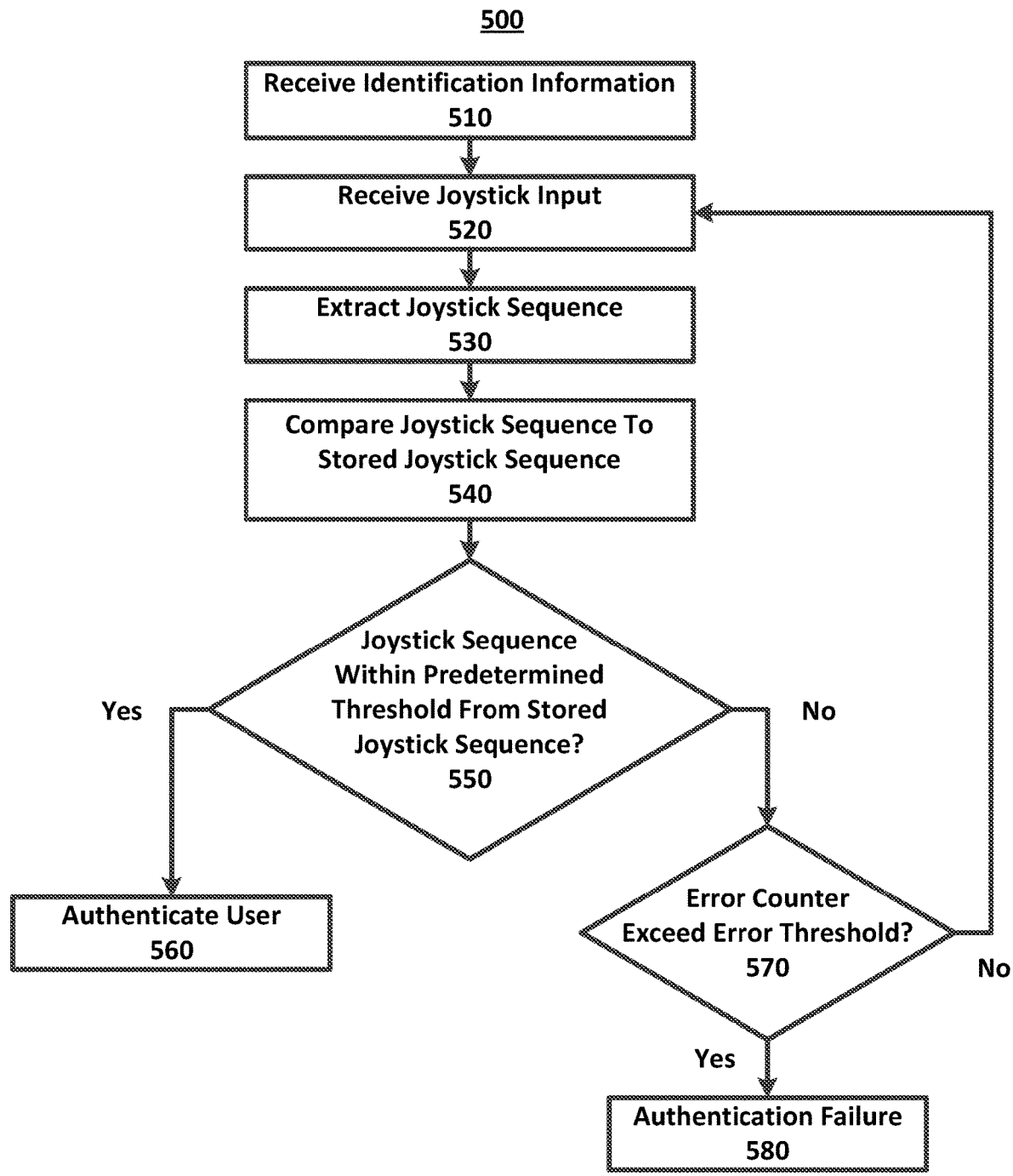
FIG. 5 depicts a first exemplary process for authenticating identification information of a user, consistent with disclosed embodiments.

FIG. 5 depicts a first exemplary process 500 for authenticating identification information of a user, consistent with disclosed embodiments. Process 500 may be implemented by using one or more aspects of systems 100 or 300, and/or one or more aspects of ATM 202 or POS system 402 to automatically perform one or more operations of the process. In some embodiments, ATM 202 or POS system 402 may perform process 500 using programs. One or more of authenticator (e.g., 120, 320), storage device (e.g., 130, 330), and/or other components of system 100 or 300 may perform operations of process 500, consistent with disclosed embodiments.

At step 510, ATM 202 or POS system 402 may receive identification information, consistent with disclosed embodiments. In some embodiments, identification information may be received from a bank card provided by the user of ATM 202 or POS system 402. In other embodiments, identification information may be received from a wireless device such as a smartphone, smartwatch, and/or electronic wallet provided by the user of ATM 202 or POS system 402.

At step 520, ATM 202 or POS system 402 may receive joystick input, consistent with disclosed embodiments. In some embodiments, joystick input may be received from a joystick (e.g., 222, 422). The joystick (e.g., 222, 422) may be part of a user interface (e.g., 220, 420) which is part of ATM 202 or POS system 402.

At step 530, ATM 202 or POS system 402 may extract a joystick sequence, consistent with disclosed embodiments. In some embodiments, a joystick sequence may be extracted from a joystick input.

At step 540, ATM 202 or POS system 402 may compare a joystick sequence to a stored joystick sequence, consistent with disclosed embodiments. A stored joystick sequence may correspond to identification information for a user of ATM 202 or POS system 402. In some embodiments, a stored joystick sequence may correspond to identification information when the stored joystick sequence is stored with the identification information for a user. In other embodiments, a stored joystick sequence may correspond to identification information when the stored joystick sequence is linked to identification information for a user.

At step 550, ATM 202 or POS system 402 may determine if a joystick sequence is within a predetermined threshold from a stored joystick sequence corresponding to identification information for a user, consistent with disclosed embodiments. When it is determined that a joystick sequence is within a predetermined threshold from a stored joystick sequence, ATM 202 or POS system 402 may authenticate a user at step 560. A user may be authenticated for at least one ATM operation and/or at least one payment operation.

In some embodiments, when it is determined that a joystick sequence is not within a predetermined threshold from a stored joystick sequence corresponding to identification information for a user, ATM 202 or POS system 402 may increment an error counter and determine if the error counter exceeds an error threshold at step 570. For example, if an error threshold is set to two, the error threshold may be exceeded when a user fails three times to perform a joystick sequence within a predetermined threshold from a stored joystick sequence corresponding to their identification information. In some embodiments, when it is determined that an error counter exceeds an error threshold, ATM 202 or POS system 402 may perform an authentication failure at step 580. Authentication failure may comprise blocking a user from performing an ATM operation and/or a payment operation. Authentication failure may comprise returning a bank card to a user. In some embodiments, when it is determined that an error counter does not exceed an error threshold, ATM 202 or POS system 402 may return to step 520 to receive another joystick input. Steps 520, 530, 540, 550, and 570 may repeat until an error counter exceeds an error threshold.

In some embodiments, when authentication failures occur over a specific time period for a specific amount of users, ATM 202 or POS system 602 may communicate an error message to a system manager. For example, when authentication failures occur for 5 users within a 4 hour period, ATM 202 may communicate an error message to a system manager. In another example, when authentication failures occur for 3 users within a 15 minute period, POS system 402 may communicate an error message to a system manager. The error message may be configured to alert a system manager to a potential malfunction in ATM 202 or POS system 402. As will be appreciated by one skilled in the art, the specific time periods and specific amounts of users mentioned above may vary. The specific time periods and specific amounts of users may be based on data including, but not limited to, a number of authentication attempts, unique users, transactions, ATM operations, payment operations, secure operations, and/or any other operation.

Figure 6:
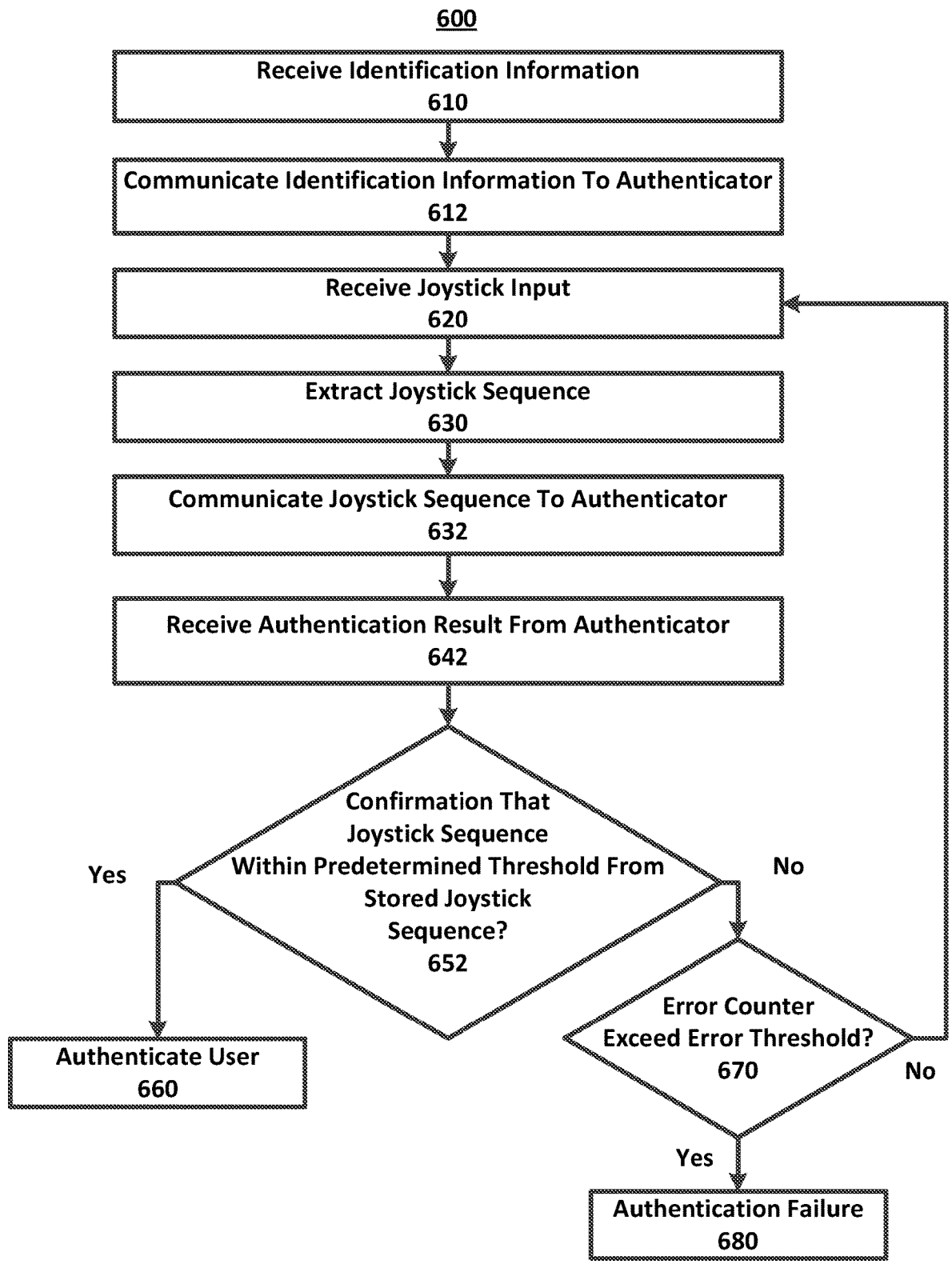
FIG. 6 depicts a second exemplary process for authenticating identification information of a user, consistent with disclosed embodiments.

FIG. 6 depicts a second exemplary process 600 for authenticating identification information of a user, consistent with disclosed embodiments. Process 600 may be implemented by using one or more aspects of systems 100 or 300, and/or one or more aspects of ATM 202 or POS system 402 to automatically perform one or more operations of the process. In some embodiments, ATM 202 or POS system 402 may perform process 600 using programs. One or more of authenticator (e.g., 120, 320), storage device (e.g., 130, 330), and/or other components of system 100 or 300 may perform operations of process 600, consistent with disclosed embodiments.

At step 610, ATM 202 or POS system 402 may receive identification information, consistent with disclosed embodiments. In some embodiments, identification information may be received from a bank card provided by the user of ATM 202 or POS system 402. In other embodiments, identification information may be received from a wireless device such as, for example, a smartphone, smartwatch, and/or electronic wallet provided by the user of ATM 202 or POS system 402.

At step 612, ATM 202 or POS system 402 may communicate identification information to an authenticator (e.g., 120, 320), consistent with disclosed embodiments. ATM 202 or POS system 402 may encrypt identification information before communicating the identification information to an authenticator (e.g., 120, 320).

At step 620, ATM 202 or POS system 402 may receive joystick input, consistent with disclosed embodiments. In some embodiments, joystick input may be received from a joystick (e.g., 222, 422). The joystick (e.g., 222, 422) may be part of a user interface (e.g., 220, 420) which is part of ATM 202 or POS system 402.

At step 630, ATM 202 or POS system 402 may extract a joystick sequence, consistent with disclosed embodiments. In some embodiments, a joystick sequence may be extracted from a joystick input.

At step 632, ATM 202 or POS system 402 may communicate a joystick sequence to an authenticator (e.g., 120, 320), consistent with disclosed embodiments. ATM 202 or POS system 402 may encrypt a joystick sequence before communicating the joystick sequence to an authenticator (e.g., 120, 320).

At step 642, ATM 202 or POS system 402 may receive an authentication result from an authenticator (e.g., 120, 320), consistent with disclosed embodiments. An authenticator (e.g., 120, 320) may be configured to compare a joystick sequence to a stored joystick sequence which may correspond to identification information for a user of ATM 202 or POS system 402. An authentication result may comprise a confirmation that a joystick sequence is within a predetermined threshold from a stored joystick sequence.

At step 652, ATM 202 or POS system 402 may determine if a confirmation has been received from an authenticator (e.g., 120, 320). The confirmation may confirm that a joystick sequence is within a predetermined threshold from a stored joystick sequence corresponding to identification information for a user. When it is determined that a confirmation has been received from an authenticator (e.g., 120, 320), ATM 202 or POS system 402 may authenticate a user at step 660. A user may be authenticated for at least one ATM operation and/or at least one payment operation.

In some embodiments, when it is determined that a confirmation has not been received from an authenticator (e.g., 120, 320), ATM 202 or POS system 402 may increment an error counter and determine if the error counter exceeds an error threshold at step 670. In some embodiments, when it is determined that an error counter exceeds an error threshold, ATM 202 or POS system 402 may perform an authentication failure at step 680. Authentication failure may comprise blocking a user from performing an ATM operation and/or a payment operation. Authentication failure may comprise returning a bank card to a user. In some embodiments, when it is determined that an error counter does not exceed an error threshold, ATM 202 or POS system 402 may return to step 620 to receive another joystick input. Steps 620, 630, 632, 642, 652, and 670 may repeat until an error counter exceeds an error threshold.

Figure 7:
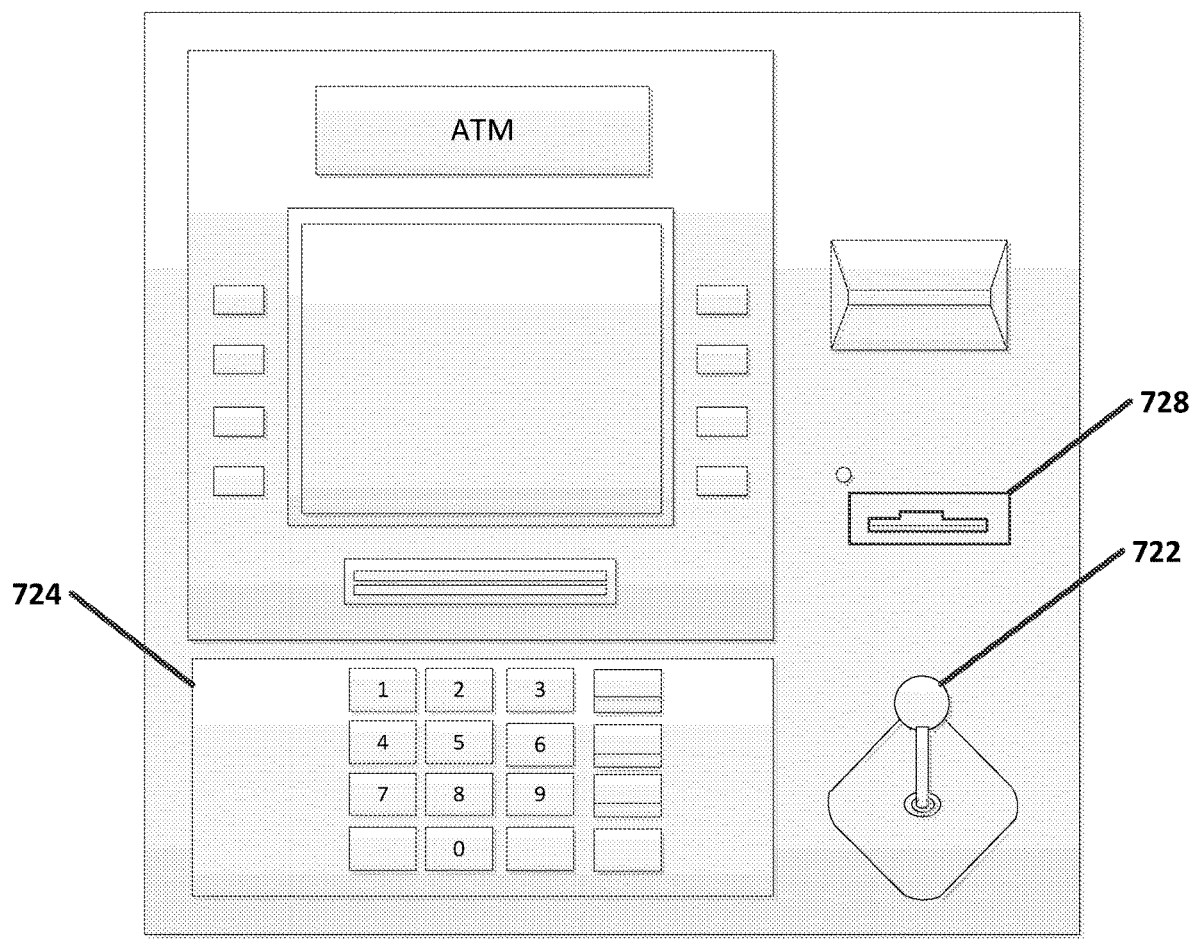
FIG. 7 depicts a first exemplary ATM, consistent with disclosed embodiments.

FIG. 7 depicts a first exemplary ATM 702, consistent with disclosed embodiments. In some embodiments, ATM 702 may implement components of system 100. ATM 702 may comprise at least some of the components of ATM 202. ATM 702 may be configured to perform operations of process 500 and/or process 600. ATM 702 may comprise a user interface which may comprise a joystick 722. Joystick 722 may comprise an arcade stick, as shown. Although various arcade sticks may take on various forms (e.g., ball top, straight top, bat top), functionality of the various arcade sticks across the various forms may be the same. A user interface may comprise a keypad 724 and/or a bank card reader 728. A user interface may be configured to receive joystick input from a user employing (i.e., using) joystick 722.

Figure 8:
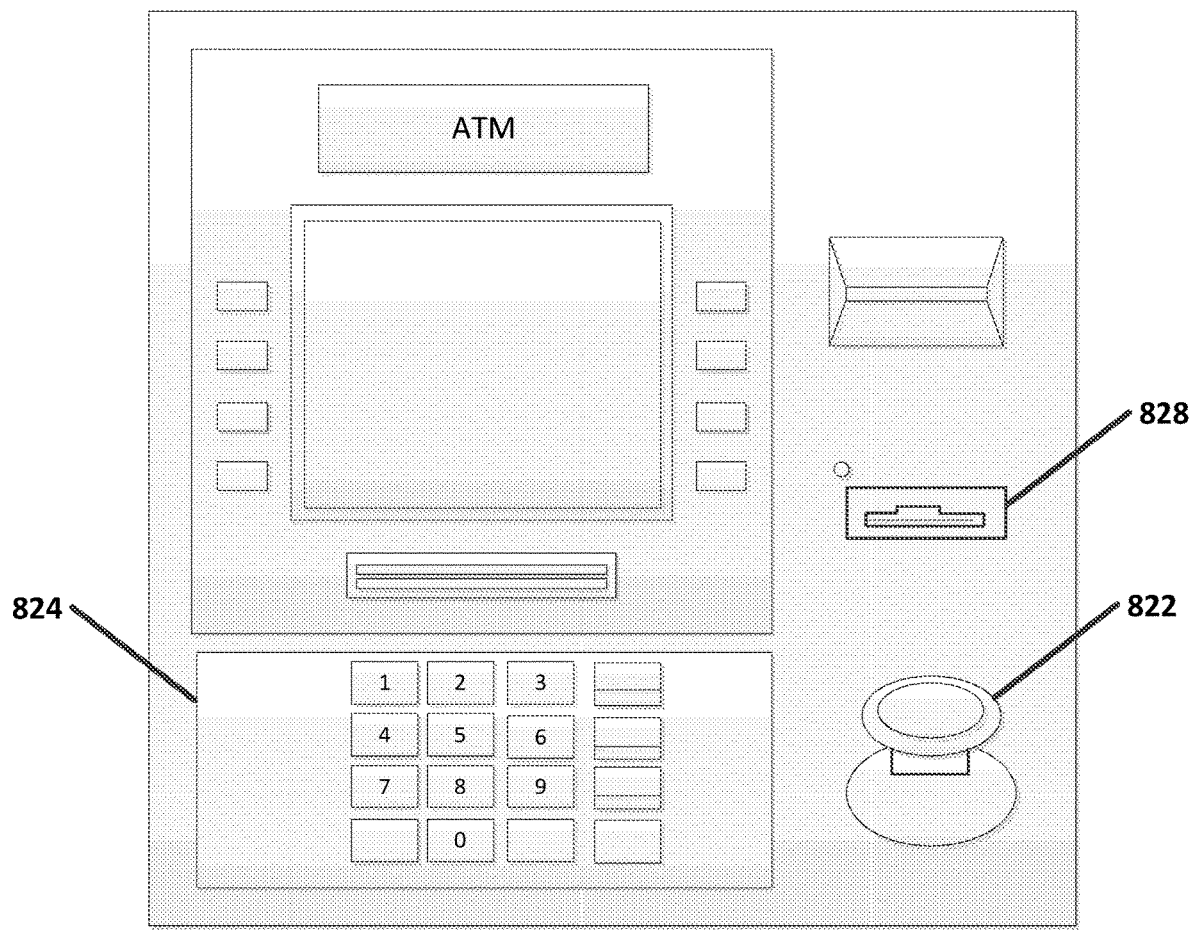
FIG. 8 depicts a second exemplary ATM, consistent with disclosed embodiments.

FIG. 8 depicts a second exemplary ATM 802, consistent with disclosed embodiments. In some embodiments, ATM 802 may implement components of system 100. ATM 802 may comprise at least some of the components of ATM 202. ATM 802 may be configured to perform operations of process 500 and/or process 600. ATM 802 may comprise a user interface which may comprise a joystick 822. Joystick 822 may comprise at least one thumbstick, as shown. At least one thumbstick may be configured to be detached from ATM 802 to be handheld by a user, and may be secured to ATM 802 through at least one cable and/or cord. Although various thumbsticks may take on various forms (e.g., concave top, convex top, flat top, tactile protrusions on top), functionality of the various thumbsticks across the various forms may be the same. A user interface may comprise a keypad 824 and/or a bank card reader 828. A user interface may be configured to receive joystick input from a user employing (i.e., using) joystick 822.

Figure 9:
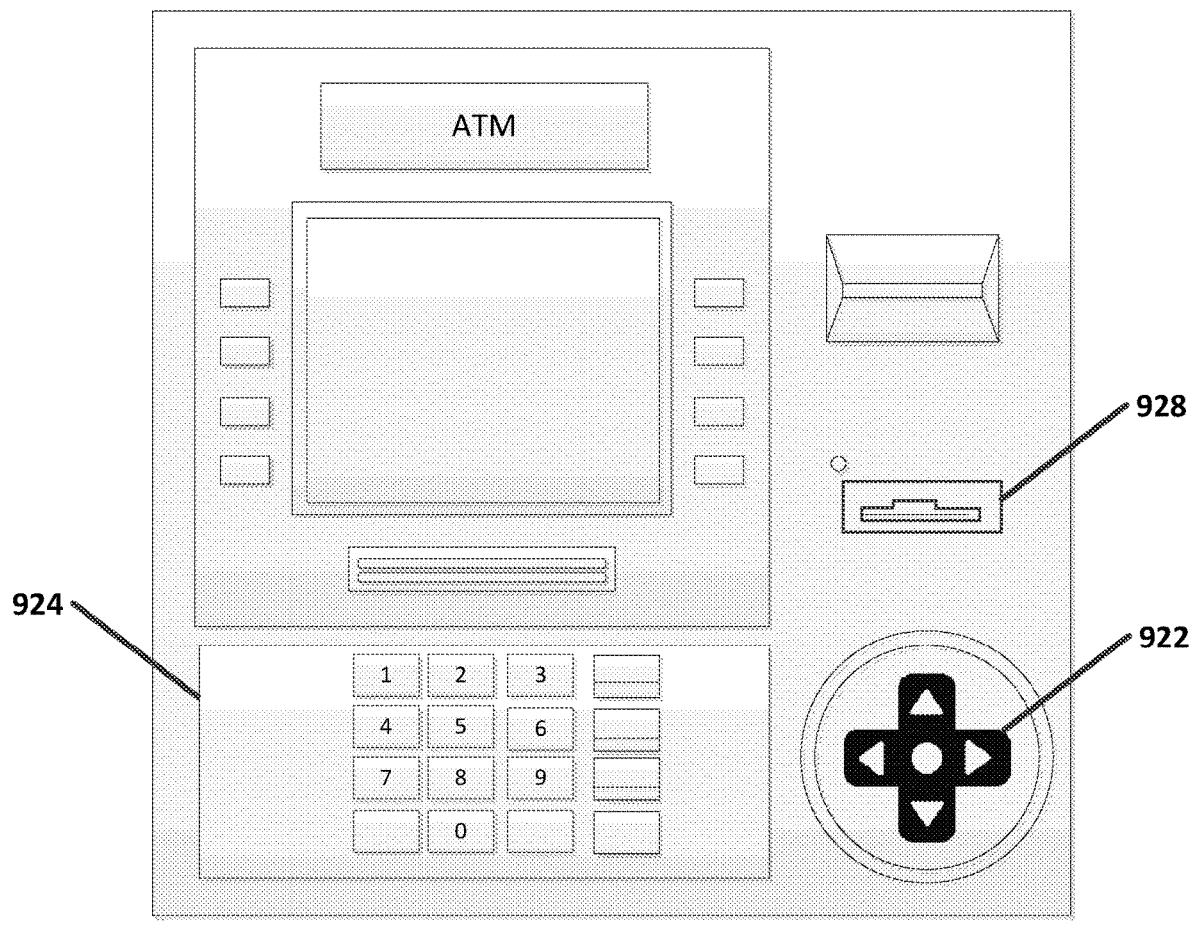
FIG. 9 depicts a third exemplary ATM, consistent with disclosed embodiments.

FIG. 9 depicts a third exemplary ATM 902, consistent with disclosed embodiments. In some embodiments, ATM 902 may implement components of system 100. ATM 902 may comprise at least some of the components of ATM 202. ATM 902 may be configured to perform operations of process 500 and/or process 600. ATM 902 may comprise a user interface which may comprise a joystick 922. Joystick 922 may comprise at least one Directional pad or Digital pad (D-pad), as shown. At least one D-pad may be configured to be detached from ATM 902 to be handheld by a user, and may be secured to ATM 902 through at least one cable and/or cord. Although various D-pads may take on various forms (e.g., square pad, cross pad, round pad), functionality of the various D-pads across the various forms may be the same. A user interface may comprise a keypad 924 and/or a bank card reader 928. A user interface may be configured to receive joystick input from a user employing (i.e., using) joystick 922.

In some embodiments, an ATM (e.g., 102, 202, 702, 802, 902) may request identification information from a user. After receiving identification information from a user, the ATM may request a joystick sequence and/or a PIN. A request for a joystick sequence, a PIN, or both may be based on a user preference. A user preference may be stored in an account corresponding to identification information of a user.

Figure 10:
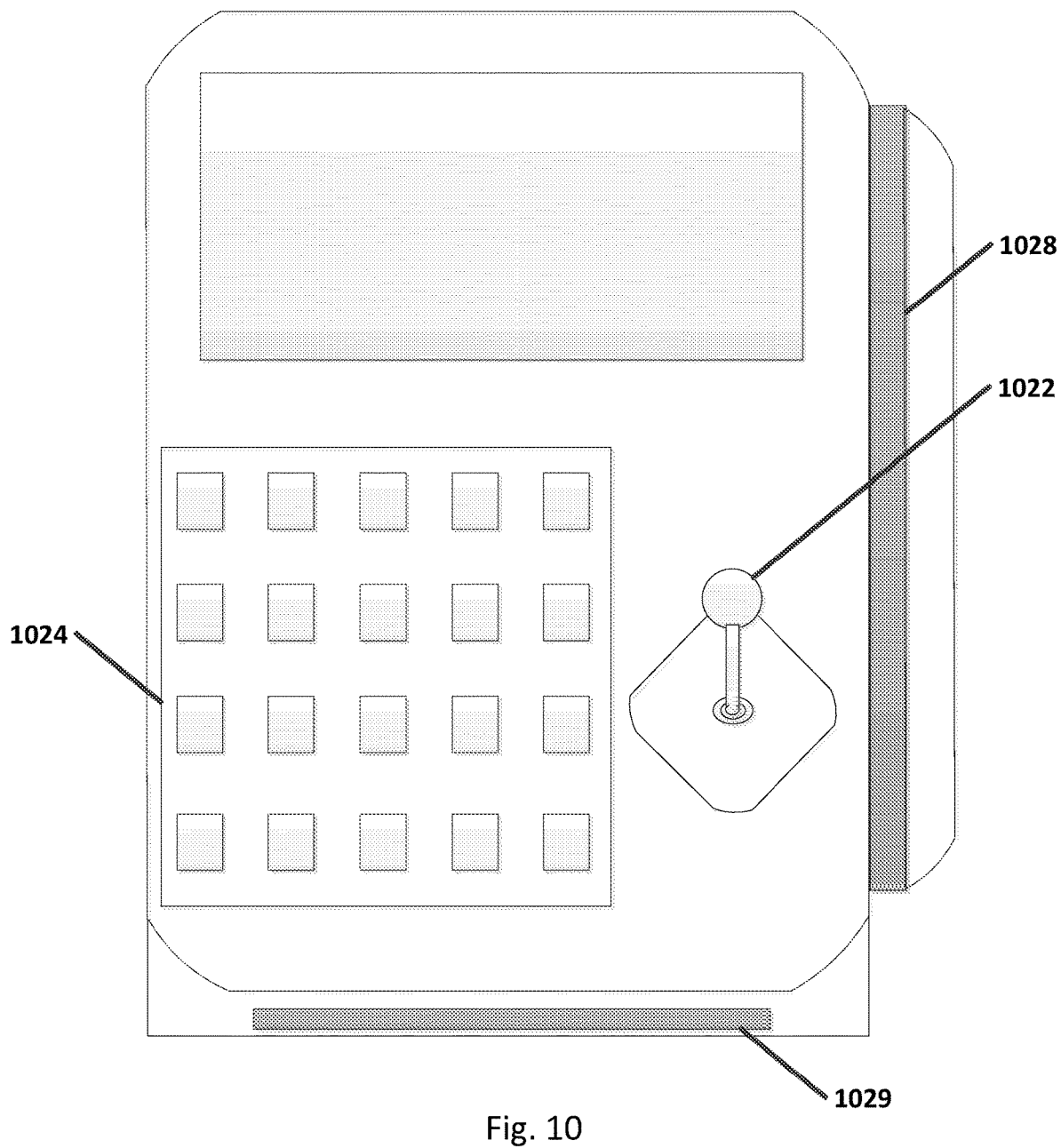
FIG. 10 depicts a first exemplary payment terminal, consistent with disclosed embodiments.

FIG. 10 depicts a first exemplary payment terminal 1012, consistent with disclosed embodiments. In some embodiments, payment terminal 1012 may comprise at least some of the components of payment terminal 412 and/or other components of POS system 402. In some embodiments, payment terminal 1012 may include at least one memory, at least one processor, and/or at least one other component, and may be configured to perform operations of process 500 and/or process 600. Payment terminal 1012 may comprise a user interface which may comprise a joystick 1022. Joystick 1022 may comprise an arcade stick, as shown. A user interface may comprise a keypad 1024 and/or at least one bank card reader (1028, 1029). Bank card reader 1028 may be configured to read a magnetic stripe. Bank card reader 1029 may be configured to read a chip. A chip may be embedded in a bank card. A user interface may be configured to receive joystick input from a user employing (i.e., using) joystick 1022.

Figure 11:
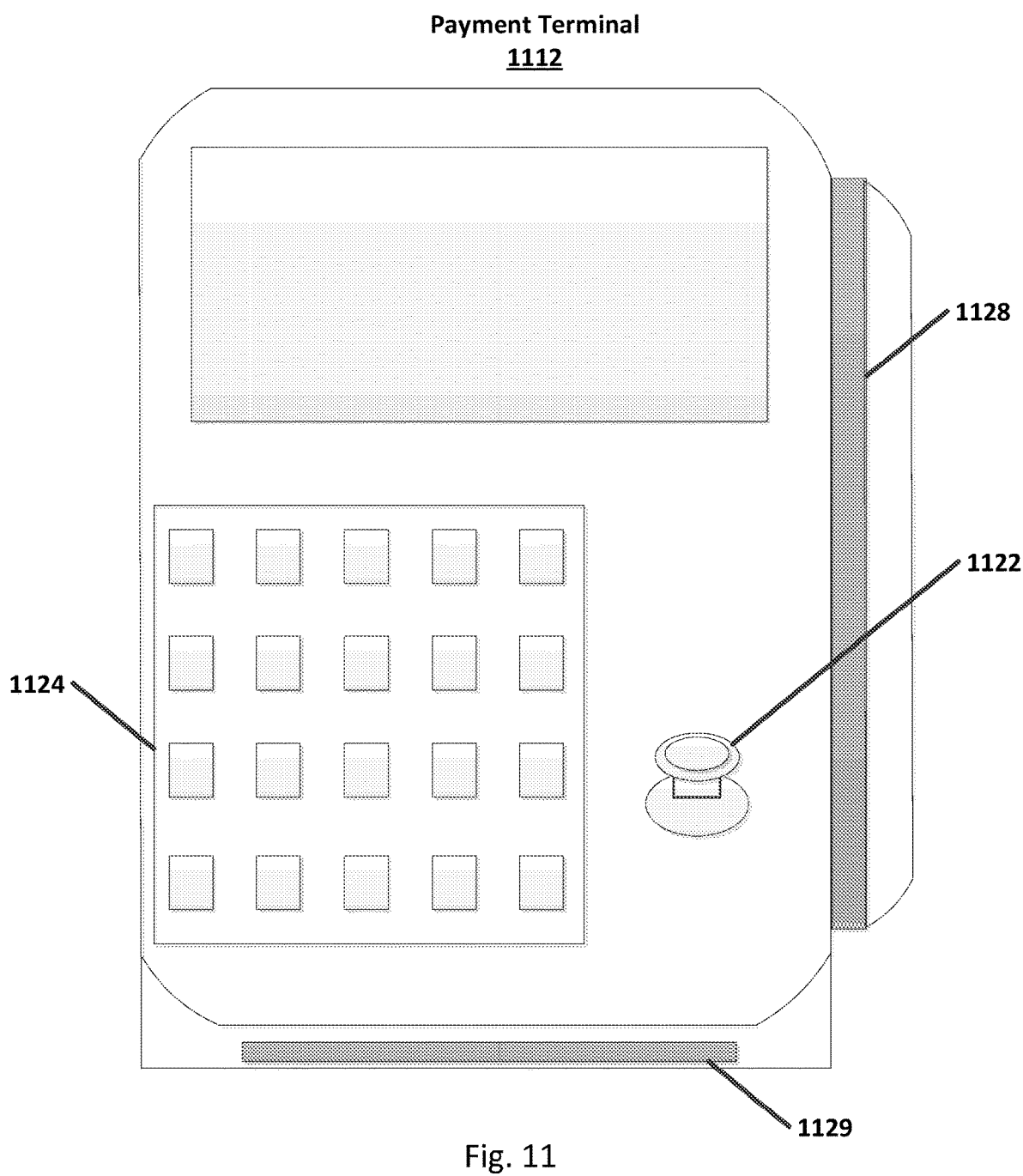
FIG. 11 depicts a second exemplary payment terminal, consistent with disclosed embodiments.

FIG. 11 depicts a second exemplary payment terminal 1112, consistent with disclosed embodiments. In some embodiments, payment terminal 1112 may comprise at least some of the components of payment terminal 412 and/or other components of POS system 402. In some embodiments, payment terminal 1112 may include at least one memory, at least one processor, and/or at least one other component and may be configured to perform operations of process 500 and/or process 600. Payment terminal 1112 may comprise a user interface which may comprise a joystick 1122. Joystick 1122 may comprise at least one thumbstick, as shown. At least one thumbstick may be configured to be detached from payment terminal 1112 to be handheld by a user, and may be secured to payment terminal 1112 through at least one cable and/or cord. A user interface may comprise a keypad 1124 and/or at least one bank card reader (1128, 1129). Bank card reader 1128 may be configured to read a magnetic stripe. Bank card reader 1129 may be configured to read a chip. A chip may be embedded in a bank card. A user interface may be configured to receive joystick input from a user employing (i.e., using) joystick 1122.

Figure 12:
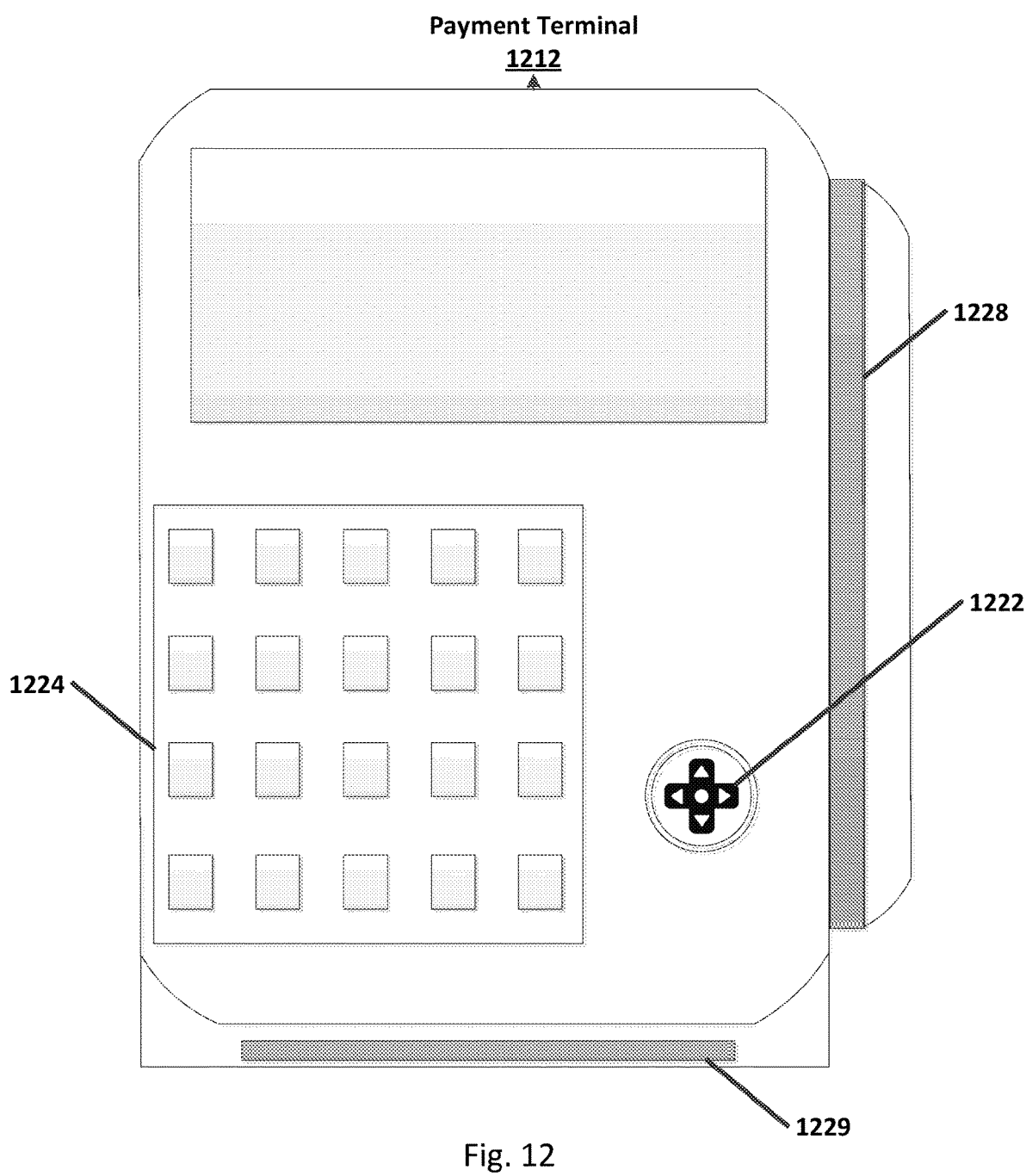
FIG. 12 depicts a third exemplary payment terminal, consistent with disclosed embodiments.

FIG. 12 depicts a third exemplary payment terminal 1212, consistent with disclosed embodiments. In some embodiments, payment terminal 1212 may comprise at least some of the components of payment terminal 412 and/or other components of POS system 402. In some embodiments, payment terminal 1212 may include at least one memory, at least one processor, and/or at least one other component and may be configured to perform operations of process 500 and/or process 600. Payment terminal 1212 may comprise a user interface which may comprise a joystick 1222. Joystick 1222 may comprise at least one D-pad, as shown. At least one D-pad may be configured to be detached from payment terminal 1212 to be handheld by a user, and may be secured to payment terminal 1212 through at least one cable and/or cord. A user interface may comprise a keypad 1224 and/or at least one bank card reader (1228, 1229). Bank card reader 1228 may be configured to read a magnetic stripe. Bank card reader 1229 may be configured to read a chip. A chip may be embedded in a bank card. A user interface may be configured to receive joystick input from a user employing (i.e., using) joystick 1222.

In some embodiments, a POS system (e.g., 302, 402) or a component of a POS system (e.g., payment terminal 412, payment terminal 1012, payment terminal 1112, payment terminal 1212) may request identification information from a user. After receiving identification information from a user, the POS system or the component of the POS system may request a joystick sequence and/or a PIN. A request for a joystick sequence, a PIN, or both may be based on a user preference. A user preference may be stored in an account corresponding to identification information of a user.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A non-transitory computer-readable medium storing instructions that, when executed by a processor, cause the processor to perform procedures comprising:
   receiving identification information from a user;
   receiving joystick input from the user;
   extracting a joystick sequence and an input duration from the joystick input; and
   when the joystick sequence and the input duration are within a predetermined threshold from a stored joystick sequence and a stored input duration corresponding to the identification information, authenticating the user for a secure operation,
   wherein the predetermined threshold is based on an average of multiple joystick sequences.

2. The non-transitory computer-readable medium of claim 1, the procedures further comprising: communicating the identification information to an authenticator; communicating the joystick sequence to the authenticator; and receiving an authentication result from the authenticator.

3. The non-transitory computer-readable medium of claim 2, wherein the authentication result comprises a confirmation that the joystick sequence is within the predetermined threshold from the stored joystick sequence corresponding to the identification information.

4. The non-transitory computer-readable medium of claim 1, wherein the predetermined threshold is specific to the user.

5. The non-transitory computer-readable medium of claim 1, the procedures further comprising a request for storing a joystick sequence.

6. The non-transitory computer-readable medium of claim 5, wherein the request for storing a joystick sequence comprises a request to enter the same joystick sequence multiple times.

7. The non-transitory computer-readable medium of claim 6, wherein an amount of travel is recorded for each joystick input of each joystick sequence.

8. The non-transitory computer-readable medium of claim 7, wherein the average of multiple joystick sequences comprises an average of the amount of travel recorded for each joystick input.

9. The non-transitory computer-readable medium of claim 6, wherein the input duration is recorded for each joystick input of each joystick sequence.

10. The non-transitory computer-readable medium of claim 9, wherein the average of multiple joystick sequences comprises an average of the input duration recorded for each joystick input.

11. The non-transitory computer-readable medium of claim 9, wherein the average of multiple joystick sequences comprises an average of the input durations recorded for two consecutive joystick inputs.

12. The non-transitory computer-readable medium of claim 9, wherein the average of multiple joystick sequences comprises an average of the input duration recorded for a specific joystick input.

13. A system, comprising:
   a payment terminal comprising a user interface, the user interface comprising a joystick and being configured to receive joystick input from a user;
   at least one memory storing instructions; and
   at least one processor configured to execute the instructions to perform operations comprising:
      receiving identification information from a user,
      receiving joystick input from the user,
      extracting a joystick sequence and an input duration from the joystick input, and
      when the joystick sequence and the input duration are within a predetermined threshold from a stored joystick sequence and a stored input duration corresponding to the identification information, authenticating the user for a secure operation,
      wherein the predetermined threshold is based on an average of multiple joystick sequences.

14. The system of claim 13, wherein the joystick comprises at least one selected from the group of an arcade stick, a thumbstick, and a D-pad.

15. The system of claim 13, wherein receiving the identification information comprises receiving the identification information from a bank card.

16. The system of claim 13, wherein the system comprises a point of sale (POS) device.

17. The system of claim 13, wherein the system comprises an Automated Teller Machine (ATM).

18. A method performed by a processor, the method comprising:
- receiving identification information from a user;
- receiving joystick input from the user;
- extracting a joystick sequence and an input duration from the joystick input; and
- when the joystick sequence and the input duration are within a predetermined threshold from a stored joystick sequence and a stored input duration corresponding to the identification information, authenticating the user for a secure operation,
- wherein the predetermined threshold is based on an average of multiple joystick sequences.

19. The method of claim 18, further comprising:
- communicating the identification information to an authenticator;
- communicating the joystick sequence to the authenticator; and
- receiving an authentication result from the authenticator, wherein the authentication result comprises a confirmation that the joystick sequence is within the predetermined threshold from the stored joystick sequence corresponding to the identification information.

20. The method of claim 8, wherein the joystick sequence comprises at least one selected from the group of a directional input, a multi-directional input, a center input, and a rolled input.

* * * * *